(12) United States Patent
Griscom et al.

(10) Patent No.: US 8,038,966 B2
(45) Date of Patent: Oct. 18, 2011

(54) COMPOSITION FORMED OF MOLDABLE POLYMERS POSSESSING A LASTING HYDROPHILIC NATURE, CHANNELS FOR AQUEOUS FLUIDS BASED ON THIS COMPOSITION, MICROFLUIDIC SYSTEM INCORPORATING THESE CHANNELS AND ITS PROCESS OF MANUFACTURE

(75) Inventors: Laurent Griscom, Rennes (FR); Bruno Le Pioufle, Brevillet (FR); Gilbert Legeay, Saint Saturnin (FR)

(73) Assignees: Centre National de la Recherche Scientifique, Paris (FR); Ecole Normale Superieure de Cachan, Cachan (FR); Association pour les Transferts de Technologie du Mans, Le Mans (FR)

( * ) Notice: Subject to any disclaimer, the term of this patent is extended or adjusted under 35 U.S.C. 154(b) by 743 days.

(21) Appl. No.: 11/569,012

(22) PCT Filed: May 10, 2005

(86) PCT No.: PCT/FR2005/001162
§ 371 (c)(1),
(2), (4) Date: Jul. 7, 2008

(87) PCT Pub. No.: WO2005/120620
PCT Pub. Date: Dec. 22, 2005

(65) Prior Publication Data
US 2008/0260588 A1    Oct. 23, 2008

(30) Foreign Application Priority Data

May 13, 2004  (FR) .................................... 04 05192

(51) Int. Cl.
*B01L 3/00* (2006.01)
(52) U.S. Cl. ....... 422/502; 422/68.1; 422/503; 521/522; 521/523; 521/524; 521/525; 521/526
(58) Field of Classification Search .................. 422/100, 422/502, 503
See application file for complete search history.

(56) References Cited

U.S. PATENT DOCUMENTS

| | | | |
|---|---|---|---|
| 3,005,728 A * | 10/1961 | Bridgeford | 428/424.6 |
| 5,198,306 A | 3/1993 | Kruse | |
| 2002/0098364 A1 | 7/2002 | Delamarche et al. | |
| 2003/0219580 A1 * | 11/2003 | Tagge et al. | 428/292.1 |
| 2005/0113510 A1 * | 5/2005 | Feldstein et al. | 524/556 |

FOREIGN PATENT DOCUMENTS

EP    0 891 807    1/1999

OTHER PUBLICATIONS

Search Report and Written Opinion for International Application No. PCT/FR2005/001162, filed May 10, 2005.

* cited by examiner

*Primary Examiner* — Brian J Sines
(74) *Attorney, Agent, or Firm* — Alston & Bird LLP

(57) ABSTRACT

The invention relates to a durable hydrophilic non-porous surface-modified polymer composition, to aqueous fluid channels based on said composition, to a microfluidic system comprising said channels, to a method for the production thereof and to a microfluidic chip or cells incorporating said composition.

26 Claims, 3 Drawing Sheets

COMPOSITION FORMED OF MOLDABLE POLYMERS POSSESSING A LASTING HYDROPHILIC NATURE, CHANNELS FOR AQUEOUS FLUIDS BASED ON THIS COMPOSITION, MICROFLUIDIC SYSTEM INCORPORATING THESE CHANNELS AND ITS PROCESS OF MANUFACTURE

FIELD AND BACKGROUND OF THE INVENTION

The present invention relates to a surface-modified composition formed of moldable polymers possessing a lasting hydrophilic nature, to channels for aqueous fluids based on this composition, to a microfluidic system, such as a microfluidic chip, comprising these channels, to its process of manufacture and to a microfluidic chip incorporating said system.

Microfluidic systems, such as microfluidic chips, are composed in a known way of inert biocompatible substrates (i.e., substrates which can be used as cell culture support) on which networks of channels are formed and they are suitable in particular for localizing in a well-ordered way, on these substrates, the deposition of proteins originating from aqueous solutions. These microfluidic systems are of major importance in fields of activity such as the biomedical field, genetics, pharmacology, analytical chemistry, synthetic chemistry or combinatorial chemistry, due to the fact that they make it possible to reduce the measuring or validation times and the volumes of reagents necessary for analyses.

These microfluidic systems are conventionally composed of a flexible polymer, such as a crosslinked rubber composition based on a silicone rubber. Advantageously, a polydimethylsiloxane (PDMS) is chosen as silicone rubber, essentially owing to the fact that it is a widespread, gas-permeable, inert and biocompatible elastomer and that it can be easily molded, making possible, at a low cost, satisfactory reproduction in a micromold of the microstructures intended to form fluidic channels on the micrometer or even nanometer scale. In addition, the transparency to visible light in the absence of autofluorescence phenomenon which characterizes PDMSs allows various methods of microscopic observation of cells within these microstructures.

However, a disadvantage of the PDMSs is that they exhibit a highly hydrophobic nature, which means that the walls of the channels of the microfluidic systems made of PDMS cannot be wetted by aqueous liquids. This is the reason why attempts have been made to develop methods for rendering PDMSs hydrophilic at the surface. It has been known for a long time that plasma surface treatments make it possible to confer a satisfactory hydrophilic state on PDMSs. Nevertheless, it turns out that this hydrophilic state is only short-lived, on account of it coming to an end in the open air after a few hours.

The paper by Papra A. et al. (Microfluidic Networks Made of Poly(dimethylsiloxane), Si and Au Coated with Polyethylene Glycol for Patterning Proteins onto Surfaces, American Chemical Society, Langmuir, 2001, 17, 4090-4095) presents a process designed to confer a longer-lasting hydrophilic nature on a microfluidic system which is, for example, based on a PDMS, this process consisting essentially (cf. page 4091):

in subjecting the surface of the microfluidic system to an oxygen plasma oxidation treatment for ten seconds,
in immersing the system thus treated for ten hours at ambient temperature in a solution of hydrochloric acid in an aqueous medium comprising a poly(ethylene glycol)di(triethoxysilane) with a weight-average molecular weight (Mw) of 3400 g/mol (hereinafter Si-PEG-Si), then
in washing the system obtained, in subjecting it to ultrasound treatments, then in drying it and in cleaning it,
in subjecting the system thus treated to oxidation for ten minutes by a solution based on aqueous hydrogen peroxide solution and on sulfuric acid,
in again washing the system thus oxidized and then in subjecting it to further ultrasound and drying treatments,
in again immersing the system obtained for 18 hours at ambient temperature in said Si-PEG-Si in solution in toluene and in the presence of hydrochloric acid, in order to obtain, by a grafting reaction of the Si-PEG-Si, a coating which adheres to the PDMS, then
in washing the system obtained and then in subjecting it to an ultrasound treatment, in order to remove ungrafted residues.

This paper indicates that the surface of the PDMS thus modified by grafting retains a hydrophilic nature for approximately three weeks.

It should be noted that the adhesion between the Si-PEG-Si and the PDMS which is obtained by the implementation of these oxidation and grafting stages is achieved by virtue of the formation of covalent bonds of siloxane type.

A major disadvantage of this process lies in its complexity and in the relatively long time which it takes to carry it out, in particular due to the use of solvents, and in the difficulty of commercially obtaining the abovementioned Si-PEG-Si polymer, the only one recommended for the grafting. This results in a relatively high manufacturing cost for this microfluidic system which is highly damaging to the possibilities of applying it industrially. It is necessary to have available processes which are simple, fast and inexpensive to implement in order to retain a low manufacturing cost, which is composed mainly of the production by molding of microfluidic systems with hydrophobic elastomers or thermoplastic polymers.

SUMMARY OF THE INVENTION

One aim of the present invention is to overcome these disadvantages and this aim is achieved in that the Applicants have discovered, surprisingly, that if, in a polymer composition which is nonporous based on at least one hydrophobic moldable polymer, the latter is modified at the surface by at least one hydrophilic polymer specifically bonded to said hydrophobic moldable polymer via hydrogen bonds, then this polymer composition exhibits, at the surface, a hydrophilic nature which is much longer-lasting than in the prior art and which can last for several months on contact with ambient air.

The result of this is that the surface-modified compositions formed of polymers according to the invention, such as compositions for channels of microfluidic systems, exhibit a wettability by aqueous fluids which is both satisfactory and much longer-lasting than in the prior art, particularly in comparison with the duration of three weeks mentioned in the abovementioned paper.

According to another characteristic of the invention, said hydrogen bonds bond hydrogen atoms of said hydrophilic polymer to oxygen-comprising groups present along the chain of said hydrophobic moldable polymer.

These oxygen-comprising groups are capable of being obtained by subjecting the nonporous composition formed of moldable polymer to a plasma surface treatment, preferably a surface treatment by a cold oxygen or argon plasma. This surface treatment is carried out in a plasma reactor comprising a gas capable of activating the surface of the moldable polymer by breaking silicon-carbon or silicon-oxygen bonds, so as to form, at the surface of said polymer, unstable free radicals.

In the case of an argon plasma, it should be noted that this gas makes it possible to break chemical bonds of the polymer which subsequently recombine, either in the reactor or, when restoring to ambient air, with oxygen atoms of the air, which very readily scavenge these free radicals.

This plasma treatment can be carried out within the radiofrequency (typically at 13.56 MHz) or microwave (typically at 233 GHz) range. Preferably, this plasma treatment stage is carried out in the radiofrequency range.

It should be noted that these hydrogen bonds are low in energy (approximately 4.5 kcal/mol) but are present in a much greater number than the covalent bonds of higher energy (between 80 and 120 kcal/mol) characterizing the abovementioned process of said paper to render rubber compositions hydrophilic, which provides satisfactory adhesion of said hydrophilic polymer to said moldable polymer. Furthermore, this adhesion takes place spontaneously, which means that the hydrophilic polymer thus bonded does not undergo any modification to its chemical structure, in contrast to the structural modifications involved by the grafting in the presence of a solvent which are inherent in the establishment of the covalent bonds in the process of said paper.

Similarly, the Applicants have discovered that if the wall-fluid interfaces of channels for aqueous fluids, channels such as those of a microfluidic system delimited by flexible biocompatible walls comprising at least one nonporous layer of polymer based on at least one hydrophobic moldable polymer, are subjected to a treatment for the formation of oxygen-comprising groups along the chain of said polymer, then, if a thin film based on at least one hydrophilic polymer is deposited on the polymer layer thus treated, which thin film adheres to this layer via hydrogen bonds, then channels are obtained having wall-fluid interfaces which are much more lastingly hydrophilic than in the prior art.

According to a preferential characteristic of the invention relating to a microfluidic system, said channels can have a circular, oval or polygonal cross section and each exhibit an internal dimension ranging from 2 µm to 500 µm. It should be noted that the above-mentioned wettability can be reflected qualitatively by the ability of an aqueous fluid, such as water, to move through these microchannels without formation of air bubbles (air bubbles being representative of regions of inadequate wettability).

According to the invention, the channels of the microfluidic systems can be composed of one or more different materials chosen in particular from silicone, glass, thermoplastics, silicon, and the like, provided, of course, that the wall-fluid interfaces of these channels comprise at least one nonporous layer of polymer based on at least one hydrophobic moldable polymer as defined above.

The invention also provides a process for the manufacture of a microfluidic system as defined above, comprising the following stages:
(i) the formation of a network of channels in a blank of said microfluidic system which is composed of a nonporous composition formed of polymer based on at least one hydrophobic moldable polymer, for example by crosslinking this composition in a micromold when said polymer is crosslinkable, then
(ii) a surface treatment, for example a plasma surface treatment, of the respective walls of the channels obtained in (i) in order to obtain a nonporous layer of polymer in which said moldable polymer comprises oxygen-comprising groups along the chain, then
(iii) the deposition of a thin film based on at least one hydrophilic polymer on the nonporous layer of moldable polymer obtained in (ii), spontaneously forming hydrogen bonds between hydrogen atoms of said hydrophilic polymer and oxygen atoms present along the chain of said moldable polymer.

It should be noted that this process according to the invention is characterized by an increased simplicity of implementation with respect to the process which is the subject matter of said paper and consequently by a cost of manufacture of the microfluidic systems which is significantly reduced with respect to that of the prior art. In particular, it should be noted that this process according to the invention can be applied to all types of synthetic or natural polymers which exhibit an at least moderately hydrophilic nature and which are capable of interacting spontaneously by contact with oxidized hydrophobic moldable polymers, for example following the plasma treatment.

Furthermore, it makes it possible to obtain microfluidic systems in which the wall-fluid interfaces of walls of the channels are lastingly hydrophilic.

The term "nonporous layer of moldable polymer" is understood to mean, generally in the present description, a layer composed of a moldable polymer composition, said composition optionally having been the site of crosslinking via a crosslinking system which this composition then comprises.

The or each moldable polymer which can be used in the composition according to the invention is advantageously chosen from the elastomers, silicone elastomers, such as, for example, polyorganosiloxanes (preferably of biomedical grade), such as polydimethylsiloxane (PDMS), and thermoplastic polymers, such as polypropylene, polyethylene, acrylonitrile/butadiene/styrene (ABS) copolymers, polyetherimide, and the like.

Among these moldable polymers, crosslinkable polymers, such as elastomers and silicone elastomers, are preferred.

The polymers of polyorganosiloxane type which can be used according to the invention are preferably prepared by crosslinking starting from a two-component system which comprises:
siloxane oligomers, such as dimethylsiloxanes, comprising vinyl groups at their chain ends, and
an organometallic crosslinking system based on a siloxane, such as a methylhydrosiloxane, and on a catalytic platinum complex.

Preferably, the ratio by weight (crosslinking system/polyorganosiloxane varies from 5 to 15.

It should be noted that silicone elastomers, such as PDMSs, are advantageously combined, in this composition of two-component type, with an inorganic filler, such as functionalized silicas, which confers, on the elastomer layer, a transparency to visible light and an absence of autofluorescence phenomenon which is particularly desired in microfluidic systems, such as microfluidic chips.

The moldable polymer composition can additionally comprise other additives, provided that they are biocompatible.

The stage of deposition, on the nonporous layer thus treated of moldable polymer, of a thin film based on at least one hydrophilic polymer which adheres to said layer via hydrogen bonds is preferably carried out substantially within a period of time of one hour after the end of the plasma treatment and, more preferably still, a few seconds after the end of this treatment, as a result of the longevity of the abovementioned free radicals, which is typically a few hours, in particular for silicone elastomers.

This thin film is capable of being obtained by deposition of an aqueous solution of hydrophilic polymer on the walls of the channels treated beforehand for the formation of said oxygen-comprising groups. In other words, the hydrophilic polymer is capable of being bonded to the moldable polymer by bringing an aqueous solution of said hydrophilic polymer into contact with said moldable polymer.

In the case of a microfluidic chip, this thin film is preferably obtained, in particular in the case of microholes and microchannels with an internal dimension of 50 to 500 µm, by deposition of drops of the aqueous solution which spread out by the capillary effect and, in the case of closed channels with a width of 2 µm to 200 µm and a height of 2 µm to 200 µm, this aqueous solution is injected using a syringe-driver.

After a period of time which is, for example, between 1 and 5 minutes approximately and which is necessary for the aqueous solution to spread out along the respective walls of the holes or of the channels, the microsystem thus obtained is rinsed with water and then dried, for example with a stream of nitrogen on in an oven at a temperature of between 40 and 50° C. approximately.

According to a preferred characteristic of the invention, this aqueous solution exhibits a viscosity, measured at 25° C. according to the Brookfield technique using a viscometer of "DIN" type equipped with a spindle of "DIN 30D" type and for a rotational speed of 300 to 500 revolutions/minute, which is between 1 and 10 centipoises.

According to a preferred characteristic of the invention relating to channels of microfluidic systems and in particular of microfluidic chips with an internal dimension ranging from 2 µm to 500 µm, said thin film exhibits a thickness of less than 1 µm and more preferably still a thickness ranging from 50 nm to 500 nm.

It should be noted that this reduced thickness of the thin film makes it possible not to block the microchannels and the microcapillaries of microfluidic systems and that a thin film of greater thickness (for example of the order of a few µm) would be liable to be the site of undesirable cracks.

Generally, use is made, as hydrophilic polymer(s) for the thin film of the channels according to the invention, of synthetic or natural polymers with a number-average molecular weight Mn preferably of greater than 5000 g/mol and more preferably still of between 10 000 g/mol and 500 000 g/mol.

According to a preferred embodiment of the invention, said hydrophilic polymer is chosen from the group consisting of polyvinylpyrrolidones, poly(vinyl alcohol)s, polyoxyethylenes, polyethylene glycols, polypropylene glycols, vinyl acetate copolymers, acrylamide polymers, polyacrylates and polymethacrylates.

More preferably still, said polymer is a vinylpyrrolidone homopolymer (PVP) which is present in said aqueous solution according to a fraction by weight of between 0.5% and 3%. Use may be made, for example, of PVPs sold by BASF under the name "Kollidon K 30" or else "Kollidon K 90".

Use may be made, as poly(vinyl alcohol) (PVA), for example, of a PVA sold by Hoechst (Clariant) under the name "Mowiol" and use may be made, as polyethylene glycol, polypropylene glycol or homopolymer and copolymers of acrylamide, for example, of those sold by Sigma.

Use may be made, as polyacrylates and polymethacrylates, for example, of those sold by Degussa (Degalan).

According to another embodiment of the invention, said hydrophilic polymer is chosen from the group consisting of cellulose derivatives, alginates and polysaccharides.

According to another aspect of the present invention, a microfluidic system according to the invention comprises a network of channels, at least one or each of which among them is as defined above, i.e. delimited by a flexible wall comprising a nonporous layer of polymer, based on at least one hydrophobic moldable polymer comprising oxygen-comprising groups along the chain which are capable of being obtained by a surface treatment of said hydrophobic moldable polymer with plasma, and a thin film based on at least one hydrophilic polymer which covers said layer at a wall-fluid interface of the channel and which adheres to said layer via said hydrogen bonds, so that the walls of these channels are lastingly hydrophilic.

Thus, the microfluidic systems in accordance with the invention are miniaturized devices incorporating systems comprising lastingly hydrophilic channels of micrometric dimensions which can in particular be provided in the form:

- of microfluidic chips which can be used in particular for biological, medical, pharmacological, cosmetic or genomic applications, and the like;
- of chips comprising cells and in particular of chips comprising living cells.

BRIEF DESCRIPTION OF THE DRAWINGS

The abovementioned characteristics of the present invention, and others, will be better understood on reading the following description of several implementational examples of the invention, given by way of nonlimiting illustration, said description being made in connection with the appended drawings, among which.

Figure 1:
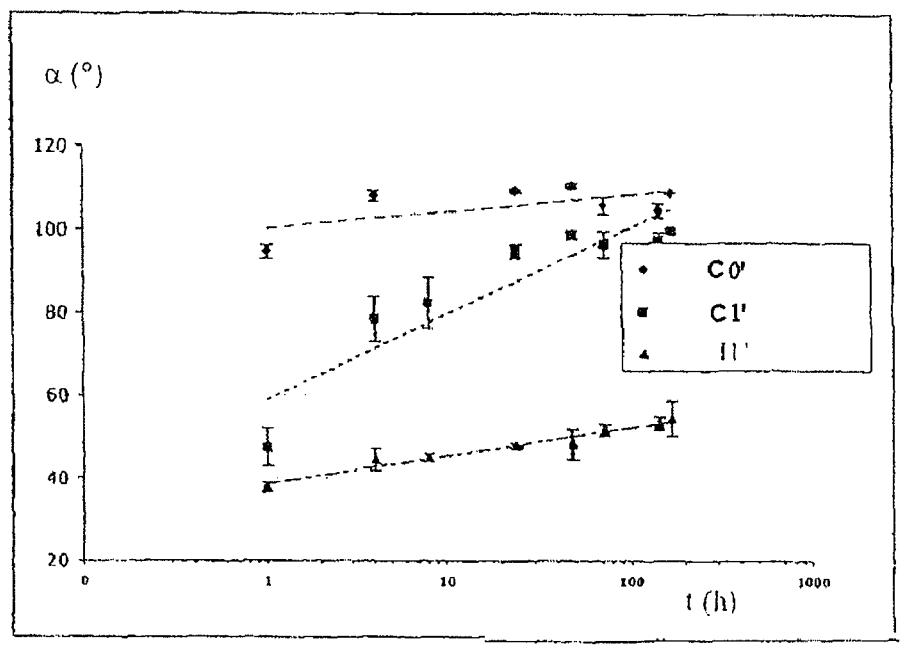
FIG. 1 is a graph illustrating the change in the wettability by water of "control" smooth samples according to the invention, as a function of the duration of their exposure to ambient air.

In the examples which follow, measurements of wetting of walls were carried out by the "water drop" method well known to a person skilled in the art. This method consists essentially in depositing a drop of water on the surface of the wall to be tested using a microsyringe and, with a filming camera, in measuring, using an automatic goniometer, the contact angle between the base of the drop on the surface and the tangent external to this surface. In a known way, a surface is regarded as hydrophobic if the contact angle measured is greater than 90° and hydrophilic if this contact angle is less than 90°.

EXAMPLE 1

Tests of Wettability by Water of Smooth Samples

Samples composed of a nonporous composition formed of crosslinked elastomer of two-component type, comprising a PDMS of biomedical grade in combination with an organometallic crosslinking system, according to a mixing ratio by weight (crosslinking system/PDMS) equal to 10, were used for all these tests.

Each of the samples exhibits a thickness ranging from 1 to 3 mm and a smooth surface with a surface area S approximately equal to 2 cm$^2$.

1) First Series of "Control" Tests and Tests According to the Invention

Use was made of samples initially composed of a PDMS composition sold by Dow Corning under the name Sylgard RTV 184 and the following were subjected to wetting tests according to the abovementioned method for measuring a contact angle of a drop of water:
- a pair of untreated "control" samples C0 (i.e., the interface of which with the water is composed of the initial PDMS composition),
- four pairs of "control" samples C1 to C4 treated with an argon or oxygen plasma in a reactor with a capacity of 20 liters and comprising an emitter of capacitive type emitting at 13.56 MHz, at the same radiofrequency power of 50 W and for periods of time of 5 and 10 min for each of the two plasmas (argon or oxygen), and
- four pairs of samples according to the invention I1 to I4 respectively obtained by dipping the samples C1 to C4, a few moments after they are obtained, in a 1% aqueous solution of a PVP (sold by BASF under the name "Kollidon K 90") for a few seconds and by then drying the samples, thus coated with a thin PVP-based film which exhibits a thickness of approximately 100 nm, in an oven at 45° C.

The results of mean contact angles obtained at a time $t_0$ immediately following the preparation of the samples, at a time $t_1$ corresponding to exposure of the samples to ambient air for 2 hours and at a time $t_2$ corresponding to exposure of the samples to ambient air for 4 days are set out in table I below.

TABLE I

| Sample | Plasma treatment (50 W) | Aqueous PVP solution dipping | Mean contact angles (degrees) of the water drops | | |
|---|---|---|---|---|---|
| | | | $t_0 = 0$ | $t_1 = 2$ h | $t_2 = 4$ d |
| C0 | none | none | 113 | 113 | 113 |
| C1 | Argon 5 min | none | 30.4 | 46.8 | 97 |
| C2 | Argon 10 min | none | 41.1 | 51.2 | 101 |
| C3 | Oxygen 5 min | none | 22.7 | 35 | 86 |
| C4 | Oxygen 10 min | none | 27.3 | 45.2 | 92 |
| I1 | Argon 5 min | yes | 24.9 | 37 | 48 |
| I2 | Argon 10 min | yes | 37.8 | 44.5 | 51.8 |
| I3 | Oxygen 5 min | yes | 27.3 | 25.9 | 23.1 |
| I4 | Oxygen 10 min | yes | 23.7 | 23.8 | 22.4 |

This table I shows that the argon or oxygen plasma treatments confer, on the "control" samples C1 to C4, only a short-lived hydrophilic state which declines substantially after 2 hours (see, for example, the contact angles of 46.8° and 51.2° obtained for the pairs of samples C1 and C2 respectively, subjected only to an argon plasma surface treatment for 5 or 10 minutes) and virtually comes to an end after 4 days, as is illustrated by the mean contact angles of 97° and 101° which respectively characterize the wettability to water of the pair of samples C1 and C2 after 4 days and which are very close to the value of 113° representative of the hydrophobic nature of the pair of samples C0 based on untreated PDMS.

On the other hand, this table I shows that the deposition of a thin hydrophilic film following one or other of the argon or oxygen plasma surface treatments confers, on the samples according to the invention I1 to I4, a lasting hydrophilic nature which is very well retained after 4 days (see the contact angles, much less than 90°, obtained for the samples I1 to I4 in accordance with the invention).

2) Second Series of "Control" Tests and Tests According to the Invention

The aim of these tests was to quantify the longevity of the deposition of the thin film according to the invention, which reflects the strength of the hydrogen bonds between the hydrogen atoms of the PVP (chosen as hydrophilic polymer) and the oxygen atoms of the PDMS having oxygen-comprising groups along the chain as a result of its plasma treatment.

To this end, use was made of samples initially composed of a crosslinked PDMS composition sold by Dow Corning under the name Sylgard RTV 184 and the following were subjected to wetting tests according to the abovementioned method of measuring the contact angle of a water drop:
- an untreated "control" sample C0' (i.e., the interface of which with water is composed of the initial rubber composition),
- a "control" sample C1' treated with an oxygen plasma in a "Branson IPC" cylindrical reactor of approximately 20 liters, provided with a capacitive emitter emitting at 13.56 MHz at a radiofrequency power of between 20 and 50 W, for a period of time of between 2 and 10 min, it being specified that, after placing under vacuum at a low level of between 1 and 10 Pa, the oxygen-based treatment plasma is emitted in order to obtain a level of vacuum of between 3 and 15 Pa, and
- a sample according to the invention I1' obtained by dipping, for a few seconds, the "control" sample C1', a few moments after it is obtained, in a 1% aqueous solution of the PVP with the name "Kollidon K 90" and then by drying the sample, coated with this thin PVP-based film, in an oven at 45° C.

a) Change in the Wettability to Ambient Air:

FIG. 1 illustrates, on a semi-logarithmic scale, the change in the contact angle α (in degrees) of water drops in contact with the smooth surfaces of the samples C0', C1' and I1', as a function of the duration of exposure t (in hours) of these samples to ambient air.

This FIG. 1 shows that, in the light of the logarithmic interpolations visible as dotted lines, the hydrophilic nature of the sample according to the invention I1' is much longer lasting than that of the sample C1' treated solely with plasma, which is only short-lived and comes to an end after one day (contact angle of greater than 90° for C1' after 24 hours). In fact, it transpires that the hydrophilic nature of the sample I1' is not only substantially intact after 8 days of exposure to ambient air but, by extrapolation, can be regarded as still present after 10 000 hours of such an exposure (i.e., more than one year) with a contact angle of 66° and even after 100 000 hours (i.e. more than 11 years) with a contact angle of 72°, which angles are markedly lower than the recognized hydrophobicity limit of 90°.

Figure 2:
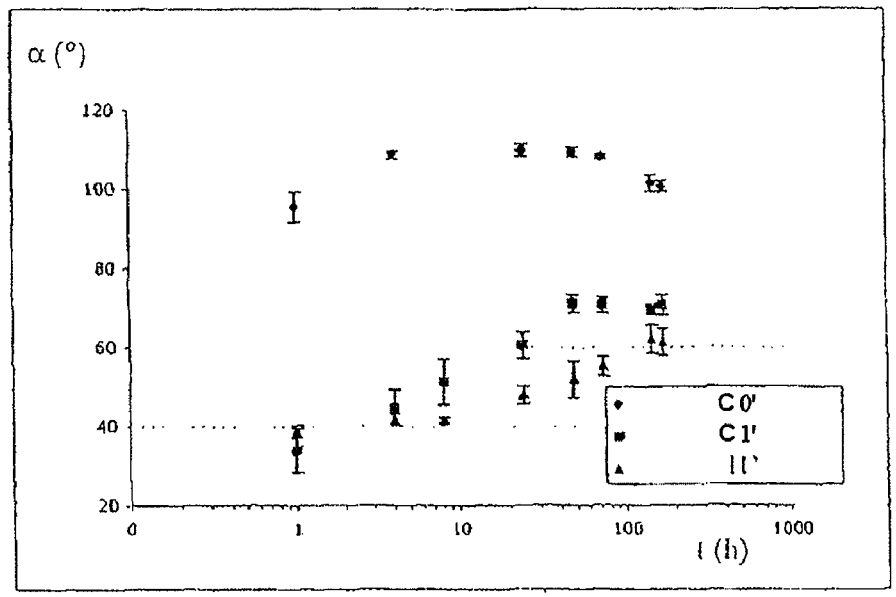
FIG. 2 is a graph illustrating the change in the wettability by water of "control" smooth samples according to the invention, as a function of the duration of their previous dipping in water.

It should be noted that this extremely slow increase in the contact angle over time which characterizes the sample I1' according to the invention testifies to a decrease which is also very slow in the surface energy of this sample (inversely proportional to the contact angle) and consequently in the stability of the adhesion of the thin PVP film to the PDMS-based layer via the hydrogen bonds connecting the PVP to the oxidized PDMS.

b) Change in the Wettability after Dipping in Water:

FIG. 2 illustrates, on a semi-logarithmic scale, the change in the contact angle α (in degrees) of water drops in contact with the smooth surfaces of the samples C0', C1' and I1', as a function of the duration t (in hours) of dipping of these samples in distilled water.

Figure 3:
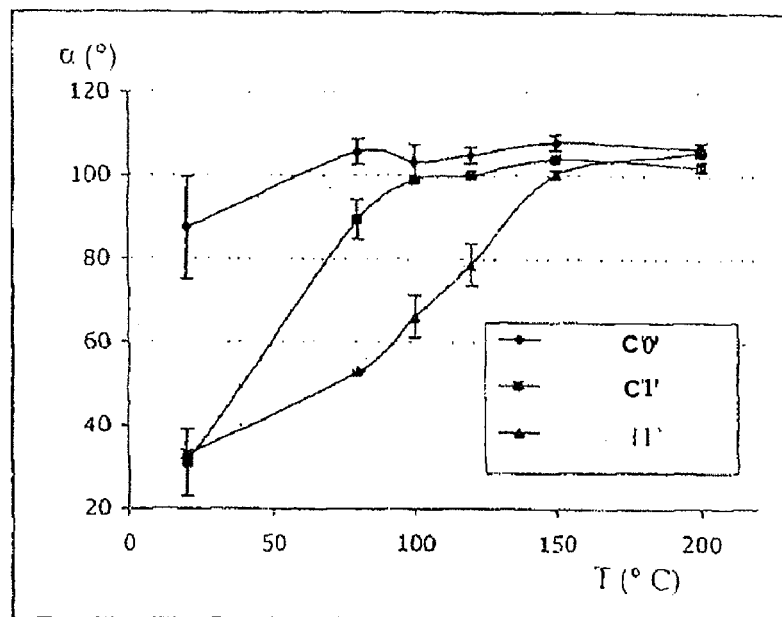
FIG. 3 is a graph illustrating the change in the wettability by water of the samples used for FIG. 2, as a function of the temperature characterizing their residence under dry heat.

This FIG. 2 shows that the hydrophilic nature of the sample according to the invention I1' is also long-lasting following dipping in water for several days (see the contact angle values for I1' of less than 60° after dipping for 100 hours), (i.e., more than 4 days) and that this hydrophilic nature of the sample I1' decreases less rapidly over time following dipping during these 100 hours than that of the sample C1' treated solely with plasma.

c) Change in the Wettability after Residence Under Dry Heat:

FIG. 3 illustrates the change in the contact angle α (in degrees) of water drops in contact with the smooth surfaces of the samples C0', C1' and I1', as a function of the storage temperature T (in ° C.) of these samples prevailing in a dry-heat oven with circulating air. The samples were subjected to a plurality of heating/cooling cycles, by gradually increasing the heating temperature of the oven from 20° C. to 200° C. and then, for each heating temperature under consideration, by measuring the contact angle of a water drop at ambient temperature after having removed the sample from the oven in order to cool it.

Figure 4:
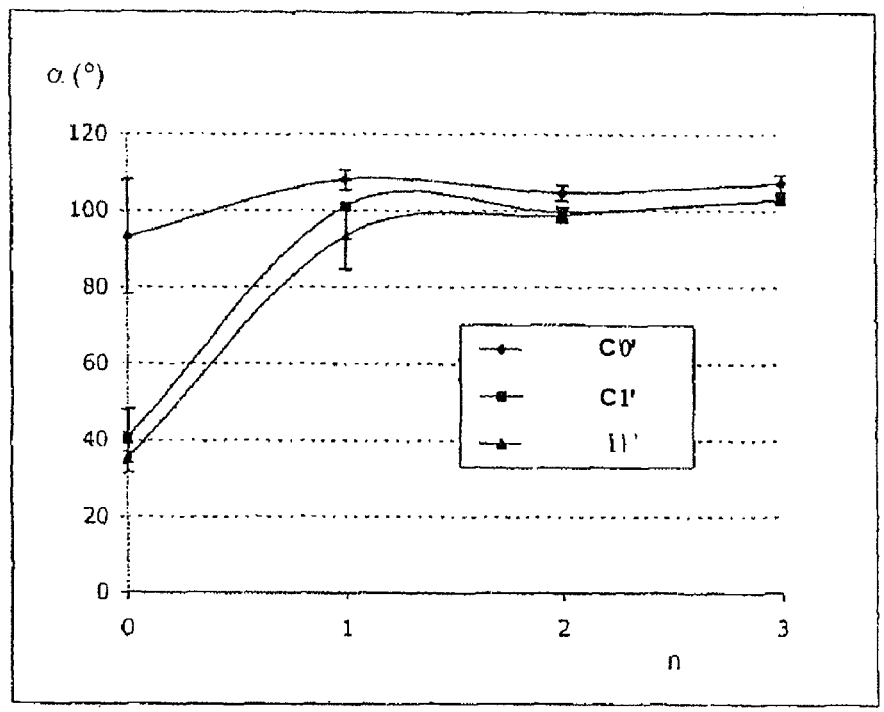
FIG. 4 is a graph illustrating the change in the wettability by water of the samples used for FIGS. 2 and 3, as a function of the number of cycles characterizing their residence under wet heat.
Figure 5:
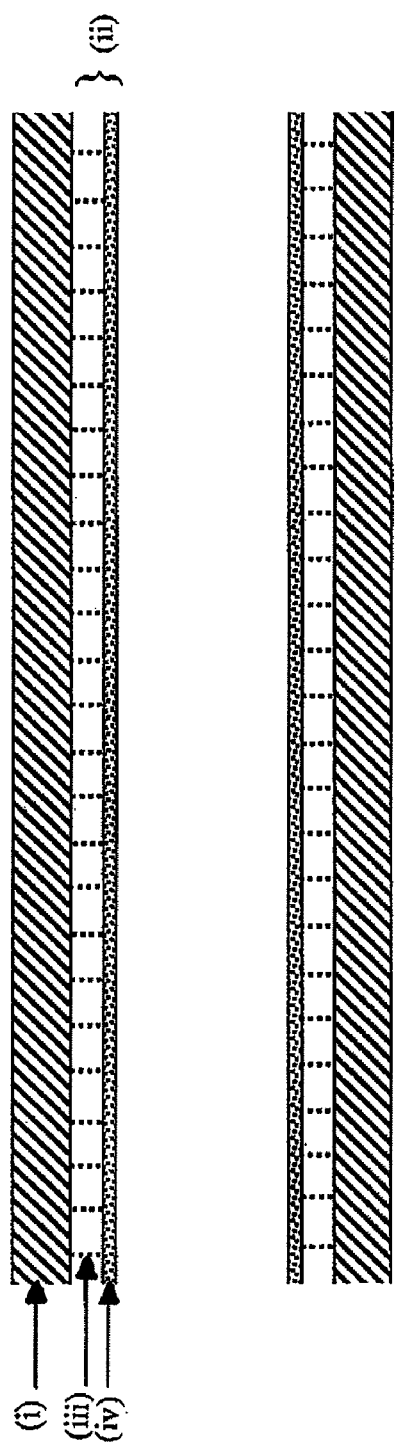
FIG. 5 shows a channel for aqueous fluids according to the claimed invention in which (i) is a flexible wall comprising a nonporous layer of polymer (based on at least one hydrophobic mouldable polymer having oxygen-comprising groups along the chain, (ii) represents a wall-fluid hydrophilic interface, (iii) represents a hydrogen bond, and (iv) is a thin film based on at least one hydrophilic polymer.

This FIG. 3 shows in particular that the hydrophilic nature of the sample according to the invention I1' decreases less rapidly with the increase in the heating temperature than that of the sample C1' treated solely with plasma, the hydrophilic nature being retained in practice even after residence at a temperature of 120° C. (corresponding to a contact angle markedly below the limit of 90°), in contrast to the sample C1', which becomes hydrophobic at a temperature of approximately 80° C.

d) Change in the Wettability Under Wet Heat:

FIG. 4 illustrates the change in the contact angle α (in degrees) of water drops in contact with the smooth surfaces of the samples C0', C1' and I1', as a function of the number of cycles of bringing under wet heat in an autoclave at 120° C. for the measurement of the contact angles at ambient temperature.

This FIG. 4 also shows that the hydrophilic nature of the sample according to the invention I1' decreases less rapidly with the number of cycles in an autoclave then that of the sample C1' treated with plasma.

e) Conclusion:

The adhesion of the thin hydrophilic film according to the invention to the layer based on oxidized silicone rubber is sufficiently strong, as a result of the abovementioned hydrogen bonds, to confer, on a channel wall based on this silicone rubber and on this thin film, a satisfactory and lasting wettability with regard to aqueous fluids, at a temperature of less than or equal to 120° C. The result of this is that the process according to the invention for rendering a channel wall hydrophilic is well suited to the manufacture of microfluidic systems, in particular of microfluidic chips.

EXAMPLE 2

Manufacture of a Microfluidic System According to the Invention and Lastingly Hydrophilic Nature Obtained 1) Manufacture of a Microfluidic System:

In a first step, the PDMS-based composition sold by Dow Corning under the name "Sylgard RTV 184" was cross-linked in a three-dimensional micromold based on a resin sold by Microchem under the name "SU-8" to produce, by curing at 70° C., a crosslinked blank of the microfluidic system comprising a network of microchannels. After 2 hours, the PDMS was cut out and removed from the mold to be stored on a glass strip.

In a second step, the channels of this blank were subjected to a plasma activation treatment of the surface of the PDMS for the formation of oxygen-comprising groups along the chain of the PDMS and the subsequent welding of the "microstructured" region of the blank (i.e., where the network of channels is formed) to a substrate of silica, glass or PDMS type.

The plasma reactor used (with a volume of approximately 60 liters) is sold by VAS under the name "RIE 300" and it comprises an emitter of capacitive type at 13.56 MHz. The blank of the microsystem was placed in the frame of the reactor so that the "microstructured" region and the substrate are directed upward. After producing an ultrahigh vacuum of $2 \times 10^{-6}$ mbar, the reactive gases (oxygen or argon plasmas, according to preference) were emitted in order to obtain a treatment pressure of 0.2 mbar. The power of the radiofrequencies emitted is between 30 and 40 W for a treatment time of 20 to 30 seconds.

After restoring to ambient air, said "microstructured" region of the treated blank and the face of the substrate exposed to the plasma were brought into contact with one another and were maintained thus for several seconds in order to obtain the welding of this region of the blank to the substrate.

In a third step, the thin hydrophilic film was deposited on the blank thus treated in the hour which followed this plasma treatment. To this end, drops of the 0.26 aqueous solution of the PVP sold under the trade name Kollidon® K 90 were injected into the channels in the following way:

for microholes and microchannels with an internal dimension of 50 μm to 500 μm, the drops of this aqueous solution were deposited on the "microstructured" region and spread out by the capillary effect. After 1 to 5 minutes, the microsystem obtained was rinsed with distilled water and was then dried, either by a stream of nitrogen or at 50° C. in an oven;

for closed channels with a width of 2 μm to 200 μm and with a height of 2 μm to 200 μm, this aqueous solution was injected using a syringe-driver of "Harvard Instruments" type. To this end, the flow rate was programmed from 10 to 30 μl/min for a total of 50 to 100 μl of solution. The microsystem obtained was subsequently rinsed with distilled water and was then dried at 50° C. in an oven.

2) Tests of Wettability to Water Carried Out on this System

It was possible to confirm that, when water is deposited on this microsystem in order to be drawn by capillary action into the channels, a meniscus of concave shape and an absence of air bubbles are observed in these channels, which testifies to the highly hydrophilic nature of the walls of the channels, and that this characteristic is advantageously retained for several months after the manufacture of this microsystem.

What is claimed is:

1. A polymer composition which is nonporous based on at least one hydrophobic moldable polymer modified at the surface by at least one hydrophilic polymer, characterized in that said hydrophilic polymer is bonded to said hydrophobic moldable polymer via hydrogen bonds, said hydrogen bonds bonding hydrogen atoms of said hydrophilic polymer to oxygen-comprising groups present along the chain of said hydrophobic moldable polymer, so that said polymer composition is lastingly hydrophilic at the surface.

2. The composition as claimed in claim 1, characterized in that said hydrophilic polymer is capable of being bonded to said hydrophobic moldable polymer by bringing an aqueous solution of said hydrophilic polymer into contact with said moldable polymer.

3. The composition as claimed in claim 1, characterized in that said hydrophilic polymer exhibits a number-average molecular weight Mn of greater than 5000 g/mol.

4. The composition as claimed in claim 3, characterized in that said hydrophilic polymer exhibits a number-average molecular weight Mn of between 10 000 g/mol and 500 000 g/mol.

5. The composition as claimed in claim 1, characterized in that said hydrophilic polymer is chosen from the group consisting of polyvinylpyrrolidones, vinyl alcohol polymers, polyoxyethylenes, polyethylene glycols, polypropylene glycols, vinyl acetate copolymers, acrylamide polymers, polyacrylates and polymethacrylates.

6. The composition as claimed in claim 1, characterized in that said hydrophilic polymer is chosen from the group consisting of cellulose derivatives, alginates and polysaccharides.

7. The composition as claimed in claim 1, characterized in that said oxygen-comprising groups are capable of being obtained by a plasma surface treatment of said moldable polymer.

8. The composition as claimed in claim 1, characterized in that said hydrophobic moldable polymer is chosen from elastomers, silicone elastomers and thermoplastic polymers.

9. The composition as claimed in claim 8, characterized in that said hydrophobic moldable polymer is chosen from polyorganosiloxanes, polypropylene, polyethylene, acrylonitrile/butadiene/styrene copolymers and polyetherimide.

10. A channel for aqueous fluids delimited by a flexible wall comprising a nonporous layer of polymer, based on at least one hydrophobic moldable polymer having oxygen-comprising groups along the chain, and a thin film based on at least one hydrophilic polymer which covers said layer at a wall-fluid interface of said channel, characterized in that said thin film adheres to said nonporous layer via hydrogen bonds, said hydrogen bonds bonding hydrogen atoms of said hydrophilic polymer to oxygen-comprising groups present along the chain of said hydrophobic moldable polymer, so that said interface is lastingly hydrophilic.

11. The channel as claimed in claim 10, characterized in that said thin film is capable of being obtained by deposition of an aqueous solution of said hydrophilic polymer.

12. The channel as claimed in claim 10, characterized in that said hydrophilic polymer exhibits a number-average molecular weight Mn of greater than 5000 g/mol.

13. The channel as claimed in claim 12, characterized in that said hydrophilic polymer exhibits a number-average molecular weight Mn of between 10 000 g/mol and 500 000 g/mol.

14. The channel as claimed in claim 10, characterized in that said hydrophilic polymer is chosen from the group consisting of polyvinylpyrrolidones, vinyl alcohol polymers, polyoxyethylenes, polyethylene glycols, polypropylene glycols, vinyl acetate copolymers, acrylamide polymers, polyacrylates and polymethacrylates.

15. The channel as claimed in claim 10, characterized in that said hydrophilic polymer is chosen from the group consisting of cellulose derivatives, alginates and polysaccharides.

16. The channel as claimed in claim 10, characterized in that it exhibits an internal dimension ranging from 2 μM to 500 μm, it being possible to use said channel in a microfluidic system.

17. The channel as claimed in claim 16, characterized in that said thin film exhibits a thickness of less than 1 μm.

18. The channel as claimed in claim 10, characterized in that said hydrogen bonds bond hydrogen atoms of said hydrophilic polymer to oxygen-comprising groups present along the chain of said hydrophobic moldable polymer.

19. The channel as claimed in claim 18, characterized in that said oxygen-comprising groups are capable of being obtained by a plasma surface treatment of said moldable polymer.

20. The channel as claimed in claim 10, characterized in that said hydrophobic moldable polymer is chosen from elastomers, silicone elastomers and thermoplastic polymers.

21. The channel as claimed in claim 20, characterized in that said hydrophobic moldable polymer is chosen from polyorganosiloxanes polypropylene, polyethylene, acrylonitrile/butadiene/styrene copolymers and polyetherimide.

22. A microfluidic system, comprising a network of biocompatible channels, at least one or each of which among them is as defined in claim 10.

23. The microfluidic system as claimed in claim 22, characterized in that it is provided in the form of a microfluidic chip or of a chip comprising cells.

24. A process for the manufacture of a microfluidic system, comprising the following stages:
 (i) the formation of a network of channels in a blank of said microfluidic system which is composed of a nonporous composition formed of polymer based on at least one hydrophobic moldable polymer, then
 (ii) a surface treatment of the respective walls of the channels obtained in (i) in order to obtain a nonporous layer of polymer in which said moldable polymer comprises oxygen-comprising groups along the chain, then
 (iii) the deposition of a thin film based on at least one hydrophilic polymer on the nonporous layer of moldable polymer obtained in (ii), spontaneously forming hydrogen bonds between hydrogen atoms of said hydrophilic polymer and oxygen atoms present along the chain of said moldable polymer.

25. The manufacturing process as claimed in claim 24, wherein stage (iii) is carried out by bringing an aqueous solution of said hydrophilic polymer into contact with the walls obtained in (ii).

26. The manufacturing process as claimed in claim 24, wherein stage (ii) is carried out by a plasma treatment.

* * * * *